United States Patent
Rampp

(10) Patent No.: US 6,971,220 B1
(45) Date of Patent: Dec. 6, 2005

(54) METHOD OF WRAPPING A ROUND BALE COMPACTED BY A ROUND BALER, FILM-WRAPPING DEVICE AND ROUND BALER THAT IS PROVIDED WITH SUCH A FILM-WRAPPING DEVICE

(75) Inventor: Erwin Rampp, Wolfertschwenden (DE)

(73) Assignee: RPP America, LLC, Ogden, UT (US)

( * ) Notice: Subject to any disclaimer, the term of this patent is extended or adjusted under 35 U.S.C. 154(b) by 0 days.

(21) Appl. No.: 09/980,527

(22) PCT Filed: Apr. 23, 1999

(86) PCT No.: PCT/EP99/02774

§ 371 (c)(1),
(2), (4) Date: Apr. 29, 2002

(87) PCT Pub. No.: WO00/64237

PCT Pub. Date: Nov. 2, 2000

(51) Int. Cl.[7] .................. B65B 53/00; B65B 11/58; B65B 11/04

(52) U.S. Cl. .................. 53/441; 53/449; 53/556; 53/216

(58) Field of Search .................. 53/399, 430, 441, 53/116, 118, 556, 204, 211, 216; 100/3, 5

(56) References Cited

U.S. PATENT DOCUMENTS

| | | | | |
|---|---|---|---|---|
| 567,548 A | | 8/1896 | Owen ................. 100/87 X |
| 3,964,232 A | | 6/1976 | Bender et al. ......... 53/118 X |
| 3,974,632 A | | 8/1976 | Van der Lely ......... 100/88 X |
| 4,092,818 A | | 6/1978 | Brewster ............. 100/87 X |
| 4,235,062 A | * | 11/1980 | Lancaster et al. ....... 53/399 |
| 4,240,339 A | | 12/1980 | Simonis ............... 100/5 |
| 4,281,500 A | | 8/1981 | Mueller et al. ........ 53/587 X |
| 4,296,595 A | | 10/1981 | Meiners .............. 53/118 X |
| 4,333,301 A | | 6/1982 | Koutonen et al. ........ 53/587 |
| 4,375,187 A | | 3/1983 | Kluver et al. .......... 100/88 |
| 4,468,922 A | * | 9/1984 | McCrady et al. ........ 57/402 |
| 4,514,969 A | | 5/1985 | Moosbrucker et al. .... 53/587 X |
| 4,532,758 A | | 8/1985 | Liet .................. 56/341 |
| 4,598,534 A | | 7/1986 | Rosenthal et al. ....... 53/587 X |
| 4,656,812 A | * | 4/1987 | Busse et al. ........... 53/399 |
| 4,685,270 A | | 8/1987 | Brambilla ............. 53/176 |
| 4,686,812 A | | 8/1987 | Bruer et al. ........... 53/118 |
| 4,723,395 A | | 2/1988 | Koutonen ............. 53/215 X |

(Continued)

FOREIGN PATENT DOCUMENTS

DE 2626263 12/1977

(Continued)

Primary Examiner—Rinaldi I. Rada
Assistant Examiner—Paul Durand
(74) Attorney, Agent, or Firm—Heimbecher & Assoc., LLC

(57) ABSTRACT

The invention relates to a method and a device for wrapping a round bale pressed in a round bale press at least about its cylindrical surface area with an at least unilaterally adhesive film (12). With the inventive method, the film (12) is pulled off by means of a pulling-off device (6, 7) from a film roll (11) in its entire width. During a predetermined space o time of said pulling-off operation, a film rope (13) is formed from the film (12). Said film rope (13) is introduced into the gap between the round bales (3) to be wrapped and a device forming the circumferential press chamber wall (2). By setting the round bale (3) into rotation, the film rope (13) present in the gap is carried along. The round bale (3) is so long rotated until the desired number of film layers has formed on the surface area of the round bale.

5 Claims, 8 Drawing Sheets

U.S. PATENT DOCUMENTS

| | | | |
|---|---|---|---|
| 4,807,427 A * | 2/1989 | Casteel et al. ................. 53/556 |
| 4,826,551 A * | 5/1989 | Ingram ....................... 156/186 |
| 4,841,851 A | 6/1989 | Quataert .................... 53/587 X |
| 5,031,771 A * | 7/1991 | Lancaster .................... 206/442 |
| 5,079,898 A * | 1/1992 | Springs et al. ................ 53/399 |
| 5,224,328 A | 7/1993 | Viaud .......................... 56/341 |
| 5,243,806 A * | 9/1993 | Jennings et al. ............... 53/118 |
| 5,255,501 A | 10/1993 | McWilliams ............. 100/88 X |
| 5,311,729 A * | 5/1994 | Viaud .......................... 56/341 |
| 5,425,512 A | 6/1995 | Bichot et al. ............ 242/541.3 |
| 5,447,009 A * | 9/1995 | Oleksy et al. ................. 53/399 |
| 5,463,843 A * | 11/1995 | Sharp ......................... 53/399 |
| 5,568,716 A * | 10/1996 | Kluver et al. ................. 53/399 |
| 5,581,974 A | 12/1996 | Underhill et al. ......... 53/587 X |
| 5,581,976 A * | 12/1996 | Underhill .................... 53/399 |
| 5,638,749 A | 6/1997 | Ansbjer et al. ............... 100/87 |
| 5,687,548 A * | 11/1997 | McClure et al. .............. 53/399 |
| 5,727,359 A | 3/1998 | Rampp ..................... 53/587 X |
| 5,784,856 A * | 7/1998 | Altvater et al. ............... 53/118 |
| 5,822,967 A | 10/1998 | Hood et al. ............... 100/88 X |
| 6,336,306 B1 | 1/2002 | Sieger et al. ................. 53/399 |

FOREIGN PATENT DOCUMENTS

| | | |
|---|---|---|
| DE | 3415310 | 10/1985 |
| DE | 8627212 | 12/1986 |
| DE | 3612223 | 10/1987 |
| DE | 3737020 | 12/1988 |
| DE | 3833988 | 5/1990 |
| DE | 3941727 | 6/1991 |
| DE | 4436414 | 4/1996 |
| EP | 0131397 | 1/1985 |
| EP | 0110110 | 4/1988 |
| EP | 0304104 | 2/1989 |
| EP | 0314923 | 5/1989 |
| EP | 0316506 | 5/1989 |
| EP | 499285 | 8/1992 |
| EP | 574679 | 12/1993 |
| EP | 0774412 | 5/1997 |
| EP | 891698 | 1/1999 |
| FR | 2679105 | 1/1993 |
| GB | 1283458 | 7/1972 |
| GB | 2159489 | 12/1985 |
| GB | 2233962 | 1/1991 |
| JP | 6056112 | 3/1994 |
| WO | WO 95/00324 | 1/1995 |
| WO | WO 99/04613 | 2/1999 |

* cited by examiner

METHOD OF WRAPPING A ROUND BALE COMPACTED BY A ROUND BALER, FILM-WRAPPING DEVICE AND ROUND BALER THAT IS PROVIDED WITH SUCH A FILM-WRAPPING DEVICE

This application claims priority to and incorporates by reference in its entirety PCT International Application No. PCT/EP99/02774 entitled METHOD OF WRAPPING A ROUND BALE COMPACTED BY A ROUND BALER, FILM-WRAPPING DEVICE AND ROUND BALER THAT IS PROVIDED WITH SUCH A FILM WRAPPING DEVICE filed on 23 Apr. 1999 by Erwin Rampp, which application was published in the German language.

TECHNICAL FIELD

The invention relates to a method for wrapping a round bale pressed in a round bale press about at least its essentially cylindrical surface area with an at least unilaterally adhesive film. The invention further relates to a film wrapping device for round bales pressed in a round bale press, in particular round bales comprising garbage, as well as a round bale press including a film wrapping device of this kind.

PRIOR ART

Round bale presses have been known for some time for pressing straw, hay or other agricultural halm and blade material. Thus, a bale rolling press for agricultural halm and blade materials is disclosed in the publication DE 34 26 965 C2, the press chamber thereof being delimited by a plurality of circularly arranged conveyor rollers receiving the harvest material which has been received by a pick-up drum. A very similar round bale press is known from EP 0 131 397 A2.

For almost ten years now it has been known to pack garbage, in particular household garbage, industrial garbage, etc., using a round bale press. By using a round bale press, air inclusions present in the garbage are pressed out from the garbage bale by continuously revolving the garbage that is being progressively filled into the press chamber of the round bale press. Thus, there does not ensue any compression of the enclosed air, rather, the air inclusions are mostly displaced towards the edge areas of the bale or are completely ousted from the formed round bale. After the pressing of the garbage bale, the pressed garbage round bale is completely wrapped with a film. By means of this complete wrapping, the normally occurring rotting process is stopped. Consequently, by means of film packings of this kind, it becomes possible to store garbage for a longer period of time without bad smells or gas development arising. To produce round bales from garbage has moreover the advantage that an intermediate storage is possible in a storage area without requiring any further preliminary arrangements. The pressing of garbage into round bales has been disclosed for the first time in the document DE 39 41 727 A1. Modified round bale presses for pressing garbage are, for example, known from DE 195 36 750 A1 and WO 95/00324. The document EP 0 004 314 B1 has still to be mentioned, wherein a bale pressing device for cardboard waste material is described, which, it is true, is only intended for being used for smaller cardboard round bales, wherein, however, also round bales are formed in principle, which are no longer wrapped with film. The press chamber here is formed by two revolving endless conveyor belts.

All of the above-mentioned round bale presses, as well as those presses which are explicitly destined for pressing garbage, as well as agricultural halm and blade materials, are provided for stabilization and shape-keeping reasons with a net-wrapping or yarn-wrapping means, with which the pressed round bale is wrapped on its surface area with a net web or a yarn. The complete wrapping with film only ensues in all cases in a film wrapping device arranged downstream, in which the bale is completely wrapped with films on its front ends and on the surface area.

Since the complete wrapping of the bale only ensues in a downstream film wrapping device, the bale of the devices known from prior art has to be kept together in a stable shape by the net web or the yarn at least on its circumference (on the surface area) for being transported between the round bale press and the film wrapping device. Thus, a net tissue web for covering round bales of this kind is known from DE 36 12 223 A1.

In summary, it has hence to be stated that the actually known pressed round bales are always wrapped with a net web or a yarn on their circumferential bale area or surface area, prior to being completely wrapped with a film. This procedure exhibits several disadvantages. First several packing materials have to be kept stored in a packing plant. Moreover, in the case of the wrapping of the pressed round bale with a net web or a yarn on its surface area, the risk of looser components of the pressed bale falling out through the net or the yarn during transportation from the round bale press to the downstream film wrapping device is rather high, a fact which can lead to a dirt accumulation in the plant and, in the worst case, to functional failure of the individual contrivances present therein. For a tight wrapping of the entire round bale with film, the film overlapping has to be conceived relatively large, whereby in the actually used film wrapping method—which will be explained in detail in the following—thick film accumulation arise at the front ends of the round bale. The film wrapping of the entire round bale ensues in such a way that the pressed round bale lying on a wrapping table is uniformly rotated about its symmetry axis, while either a film roll rotates about a vertical axis about the round bale, or, in case of a stationary film roll, the round bale is in addition rotated about its vertical axis. Caused by the inevitably necessary large film overlapping for achieving a tight packing, the film consumption per bale is relatively high. Therefore, the packing costs per finished round bale are high, as well.

REPRESENTATION OF THE INVENTION

The technical problem on which the invention is based consists in realizing a method, by means of which the aforementioned disadvantages are at least in part eliminated. The invention is further based on the technical problem of providing a device for realizing a method improved in this way.

The inventive method is characterized in that during the unwinding of a film web from a film roll, a film rope is formed from the wide film web over the entire width during a predetermined period of time by means of pulling-off means, said film rope being advantageously gathered up in its width. Under film rope, here, a film portion has to be understood in a general manner, which has in some way been formed from the present film web and which exhibits a higher flexural rigidity. Thereby, the normally present adhesiveness of the film is optionally used. It has, however, to be emphasized, that if the case may be, a non-adhesive film can be used, as well, which prior to the forming of the film rope, is modified by acting upon the film material (heat treatment, application of a chemical substance, application of an adhesive, etc.) in a way that joined film parts adhere to one another.

At the forming of this film rope of higher rigidity extending over a partial section of the film web length, i.e. over a determined length of the film web, it is possible for the first time to use a film as an enveloping material for a pressed round bale instead of the previous net or yarn web. By means of the rope formation, the film can be introduced into the gap between the pressed round bales and the circumferential press wall formed by any device. By then rotating the bales again in the press, the film is wrapped over the bale surface area with engagement and carriage of the film rope, and namely in the full width of the film web, such as it was hitherto already realized with the net web. By forming a single layer or multiple layers on the circumferential bale wall, a sufficient stability of shape and strength for the further transportation of the bale to the film wrapping device is given, wherein the prepared bale is completely wrapped with film. All hitherto made attempts to replace the previously necessary net web with film, were insofar unsuccessful due to the at least unilaterally adhesive film, said very thin film could not be applied without great effort, in particular not automatically, to the circumferential bale wall. With a pulling-off means consisting of two rollers arranged forming a gap between the rollers for the passage of the film length, one of said rollers being driven, it particularly caused the at least unilaterally adhesive film to adhere to one of the rollers, thus preventing the film from being further pulled off from the film roll, and in particular from being applied to the bale surface area.

This hitherto unsolved problem with affected pulling-off means having adjacent rollers for delivering the film, is solved by the inventive formation of a film rope, since the film rope of now higher-rigidity can be easily guided—in particular in the case of at least one resiliently supported roller—through the roller gap of a conventional pulling-off means, and can then be introduced automatically into the gap between the round bale and the circumferential edge of the press chamber.

By initially wrapping the bale surface area with two or more film layers, the subsequent complete wrapping can be carried out with a by far less overlapping wrapping, so that the amount of film required for a film wrapping is reduced. For this reason, the production costs for a film-wrapped round bale are distinctly lower than previously.

It is, for example, possible that only two instead of hitherto four layers of film are necessary. Moreover, the risk of damage is reduced for a completely wrapped round bale during transportation and handling of a finished wrapped bale, since the film is now pre-stressed in two directions, for one, in the circumferential direction and, for another, in 90° relative thereto. Thereby, it is possible, that a hole, involuntarily punctured through the two films during transportation, does not expand, and that actually only a small through-going hole remains. This is achieved in that the hole introduced into the film, which is pre-stressed in the circumferential direction, expands slot-shaped in the circumferential direction of the one film, and in the superposed film layer twisted by 90°, expands likewise slot-shaped by twisted by 90°. By means of the superposition of these slots staggered relative to one another by 90°, there only remains the extremely small hole, which does not cause any problems. Moreover, it has to be stated that the bales inventively wrapped in a novel manner become tighter at their circumferential or surface area by the finally resulting "cross adhesion bond." Thereby, the bale content is better protected against penetrating rain water or against short water accumulations on the bale storage ground in case of temporary flooding when used in agriculture.

Finally, it is to be stated that, as it is usual to date, round bales of dry hay or straw are only net-wrapped and not completely film-wrapped. In this case, however, the inventive film wrapping on the surface area instead of the net without covering the front ends, is of an important advantage for durability in an open storage. This means that rain water would not only flow off from the surface area by the existing compression of the haulm or garbage materials, but would also be prevented from penetration for the first by the film applied to the surface area. Thereby, it is of course optimal that the film webs are wider than the wrapped round bale, so that the projecting film edges can serve as a "roof."

According to the invention, the films hitherto used in this field can also be used for the wrapping of surface areas of round bales. Therewith, it is only necessary to keep one film type in storage. Moreover, it is possible according to the invention, to use films having a thickness of only 10–20 μm, in particular 15–18 μm. To date, film thicknesses of 25 μm were usually employed in agriculture, said film thicknesses having even been increased to 30 μm so as to achieve at least a better rigidity. These films, however, due to their important thicknesses, are in turn more expensive and heavier.

As can be seen from the above statements, the invention may not only be used for round bales of garbage but also for agricultural halm and blade materials. Moreover, animal food, for example, which is compressible and compactable by rotary compression, can be packed correspondingly.

The formation of the film rope advantageously ensues by gathering up the film in its width. By means of the film's (unilateral or bilateral) adhesiveness or its capacity for adhering, a film rope of higher rigidity is formed by pushing the film edges together, said film rope exhibiting the aforementioned advantages. Alternatively thereto, a torsion or twisting of the film about a longitudinal axis of the film web is also possible for forming the film rope. From the constructional point of view, however, the realization of this method is more complicated.

In an optimum manner, a film rope is formed for the periodic wrapping of the film about the bale surface area shortly before finishing the last film layer, and the film web is then cut off in front of the film rope. Therewith, the necessary prerequisites are created for wrapping a subsequent pressed round bale again on its surface area with one or more layers of a film, in particular with two layers.

It is extremely advantageous that after the wrapping of the bale on its surface area, a wrapping ensues over the front ends with the same film length, so that the bale is completely packed as a whole.

As in case of the hitherto usual round bale presses, however, the subsequent complete wrapping can also be carried out in a downstream film wrapping device, for which reason the film-stabilized round bale is outputted from the round bale press and transferred to a wrapping table, on which the round bale is then completely wrapped with film in the conventional manner. This wrapping table is thereby in particular realized according to prior art, such as it is, for example, disclosed in DE 195 42 645 A1.

The hitherto used films are employed as films. In particular, an elastic PE film can be used. Particularly good properties are also exhibited by the so-called LLDPE films provided with an adhesive layer on the inner side. As already outlined before, a film can also be used which only becomes adhesive under certain conditions such as, for example, a heat treatment.

An inventive film wrapping device for round bales pressed in a round bale press features a film roll holding device associated with a pulling-off device for pulling off the film from the film roll. Moreover, a film rope forming device is present by means of which a film rope can be realized in the pulled off film web over a certain film web length. For cutting the film off, a cutting means is arranged downstream of the pulling-off device.

A technically very simple and cost-efficient solution for a film roll holding device consists of a receptacle box for receiving the film roll, comprising an outlet opening for the film on one side, the opening being approximately adapted to the film width. Therewith, complicated and expensive supports are not required.

So as to reduce friction of the film roll within the receptacle box, several rotatably mounted supporting rolls are present within the receptacle box, with the rotation axes thereof being parallel to the longitudinal axis of the film roll.

Alternatively thereto, a film roll holding device is provided comprising a fastening device holding the film roll at its front side.

Alike the hitherto known net wrapping devices, the pulling-off device advantageously comprises at least two rollers between which the film is to be guided through, and at least one of them being driven.

For enabling the formed film rope to pass through the roller gap of the two rollers opposed to one another, at least one roller of the roller pair is non-rigidly (e.g. resiliently) mounted.

The film rope forming means according to an advantageous embodiment comprises a film rope constriction means bilaterally engaging the film edges and being variable in their mutual spacing. Thereby, the wide film rope is gathered up to a smaller width, and a film rope of higher rigidity is formed, which for the first time can be introduced between the round bale and the circumferential press chamber wall without further auxiliary means.

A technically simple and again cost-efficient solution for a film rope constriction means comprises two or more pivotably mounted pivot arms equipped with rolls, which can be brought into engagement with the edges of the film web.

Since the pivot arms are mechanically coupled by a lever system, only one drive means is necessary for pivoting the plurality of pivot arms. Alternatively thereto, it is of course also possible to pivot each single pivot arm by a (pneumatic or hydraulic) control cylinder. Moreover, a drive by an electromotor is also possible. The inventive film wrapping device preferably comprises a control means controlling the film rope forming device and the cutting means in such a coordinate manner that shortly before the desired number of film layers will be wrapped around the surface area of the round bale, said film rope forming device will be activated over a certain space of time so that a film rope comprising again a predetermined length will be formed. After the formation of the film rope, the cutting means is then activated so that the film, seen in the pulling off direction of the film, is cut in front of the film rope.

A film wrapping device according to the invention is already advantageously integrated into a round bale press such as it is used in the state of the art for pressing agricultural harvest products or halm and blade material, or for pressing of garbage, instead of the previous net or yarn wrapping device. It is, however, also possible to subsequently install without any difficulties, such an inventive film wrapping device into an existing round bale press of the aforementioned kind to substitute the existing net or yarn wrapping devices. Such retrofit works are possible without major expenditure. Therewith, it is in particular possible to reduce the production costs per bale even in existing round bale presses.

SHORT DESCRIPTION OF THE DRAWINGS

For further explanation and for a better understanding, an exemplary embodiment of the invention will be described in the following with reference to the attached drawings.

DESCRIPTION OF A PREFERRED EMBODIMENT OF THE INVENTION

Figure 1:
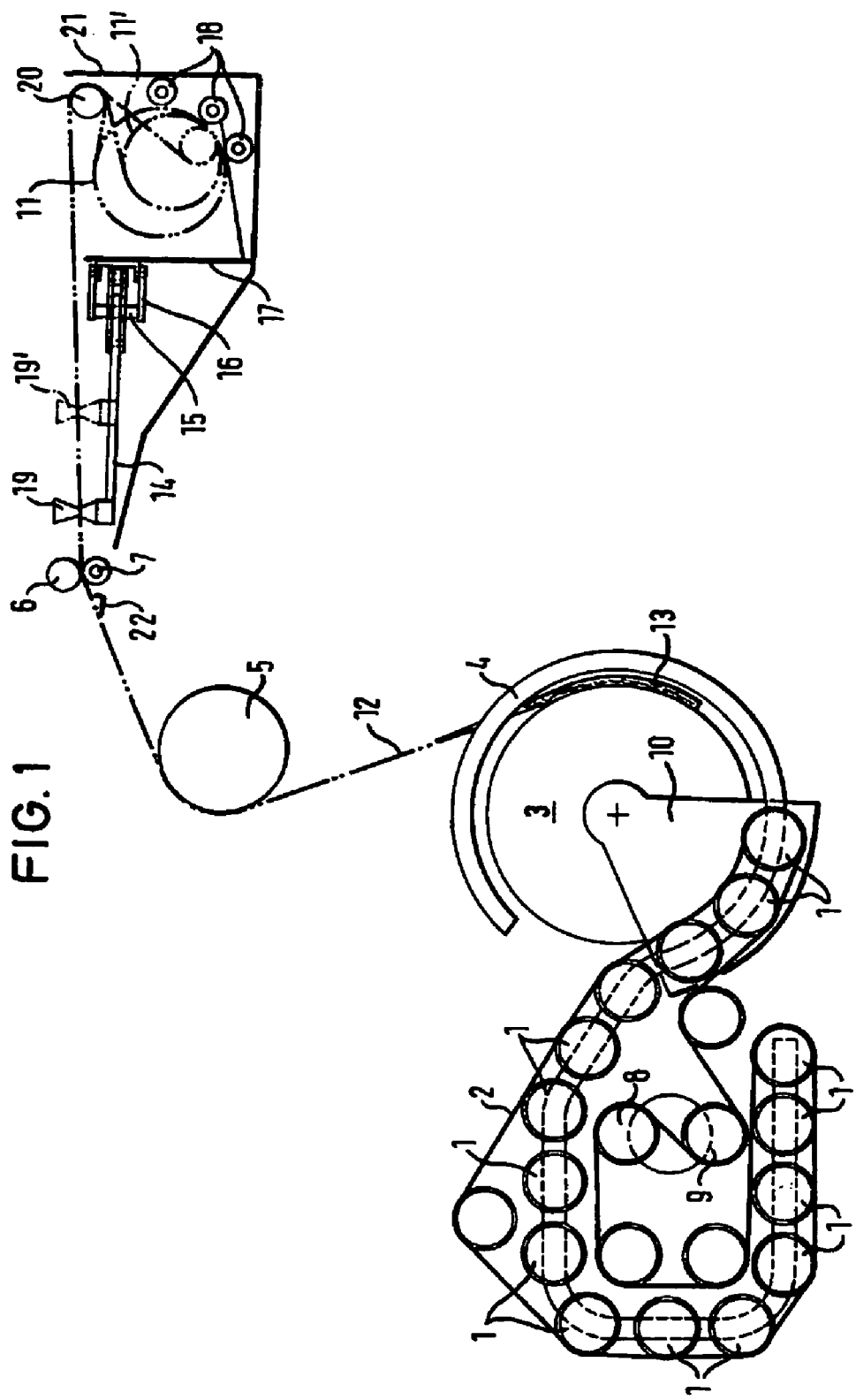
FIG. 1 is a schematic side view of a film wrapping device of a round bale press.

In the schematic side view as per FIG. 1, a round bale press is shown comprising a number of supporting rolls 1 displaceable along a crank guide 4. Through a crank displacement means 10, the supporting rolls 1 are essentially arranged on a full circle, so that a cylindrical round bale press chamber arises. The supporting rolls 1 support an endless belt 2 forming the circumferential wall of the press chamber. By means of tension rollers 8, 9, the tension of the endless belt 2 is adjusted in the desired manner.

Above the round bale press, which in this way corresponds to prior art, a film wrapping device according to the invention is arranged. Said film wrapping device comprises a receptacle box 21, in which a plurality of supporting rolls 18 are rotatably arranged. Said supporting rolls 18 are parallel to one another with their rotational axes and serve for supporting a film roll 11 present in the receptacle box. Reference numeral 11' designates a film roll having a reduced diameter due to film consumption. Two holding devices 16 are attached spaced apart from each other on a side wall 17 of the receptacle box 21. Said spacing is at least larger than the film web width of the film web 12 which is being pulled off from the film roll 11. A pintail 15 is rotatably mounted in the respective holding device 16, on which pintail 15, in each case a pivot arm 14 is pivotably mounted. On the front end of said pivot arm, film edge constriction means 19 are in each case arranged, the rotational axes thereof being essentially perpendicular to the longitudinal direction of the film web.

In front of the film wrapping device including the pivot arms 14, a film pulling-off device is arranged in the form of two opposing rollers 6, 7, roller 7 being driven. Roller 6 is resiliently mounted with respect to roller 7, so that depending on the thickness of the film, the roller gap between the roller 6, 7 automatically adjusts in the manner required for allowing the film or the thicker and more rigid film rope to pass through. Both rollers 6, 7 are provided with a friction-increasing lining, e.g. a rubber lining.

In front of said film pulling-off device, a cutting means 22 is present by means of which the film web 12 can be cut transversely to its extension direction.

In front of said cutting means 22, a deflection of roller 5 is arranged, by means of which the film is deflected into the press chamber of the round bale press. The representation of FIG. 1 is only schematic here, and does, for one, not reflect the correct dimensional relationships and, for another, does not reflect either the spatial arrangements of the deflection roller of the round bale press corresponding to the actual conditions.

Figure 2:
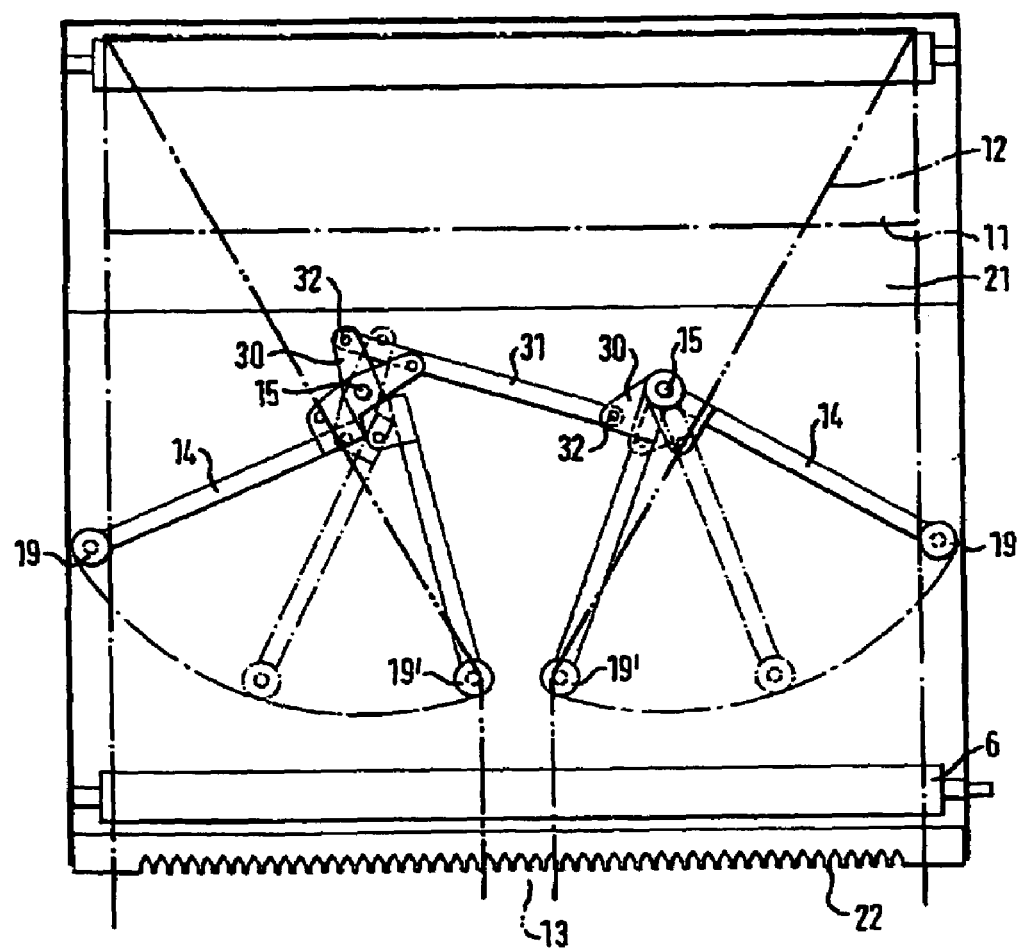
FIG. 2 is a top plan view of the film wrapping device as per FIG. 1.

In FIG. 2, the film wrapping device having two pivotably mounted pivot arms 14 can be seen in the greater detail. Thus, levers 30 are fixed at the ends of the pivot arms 14, opposite the rolls 19, which are coupled with one another via a connecting rod 31. Said connecting rod 31 is thereby articulated in the levers 30 by means of link joints 32. By means of this configuration, a single drive of one pivot arm allows to correspondingly pivot the second pivot arm 14 in a mirror-inverted manner, so that the spacing between said rolls 19 can be reduced in the desired manner.

Figure 3A:
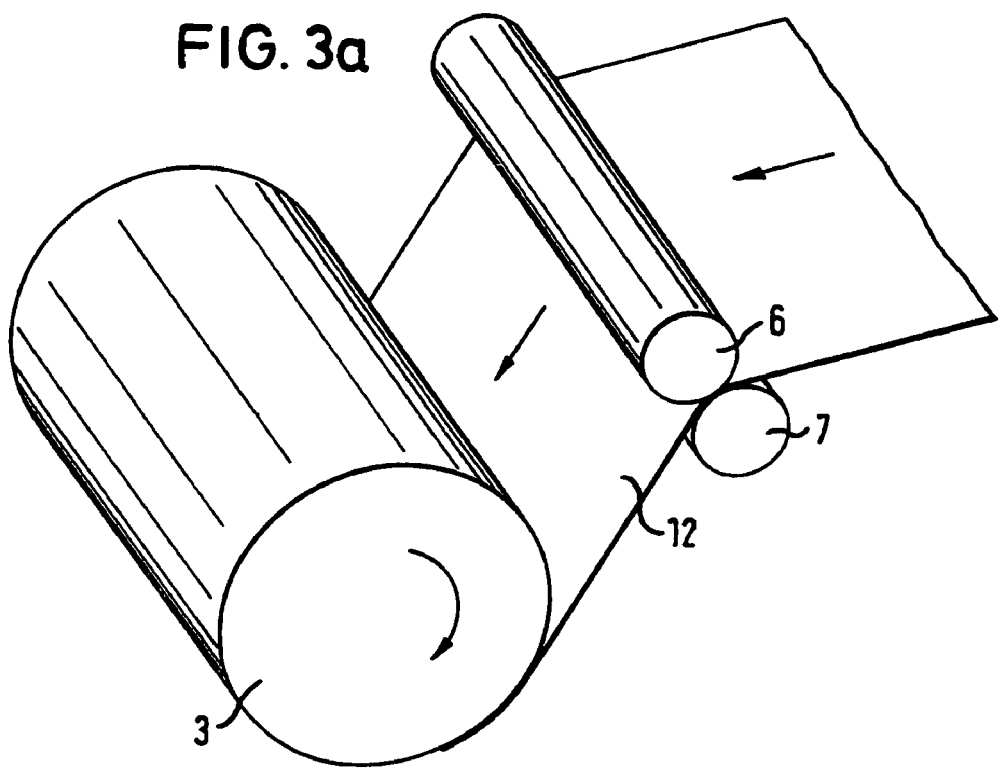
FIGS. 3a–3e are schematic perspective views of various method steps for forming a film rope in a film web, and the guidance of same towards a pressed round bale, which, however, is not fixed on its circumferential side.

The inventive method will now be described in particular with reference to FIGS. 3*a*–3*e*. In a round bale press as per FIG. 1, a round bale 3 is produced in the conventional manner. As shown in FIG. 3*a*, the film has been guided once through between the rollers 6, 7, it will adhere to the round bale 3 due to its adhesive inner side, and will be carried along through rotation of the round bale 3 by means of the endless belt 2.

Figure 3B:
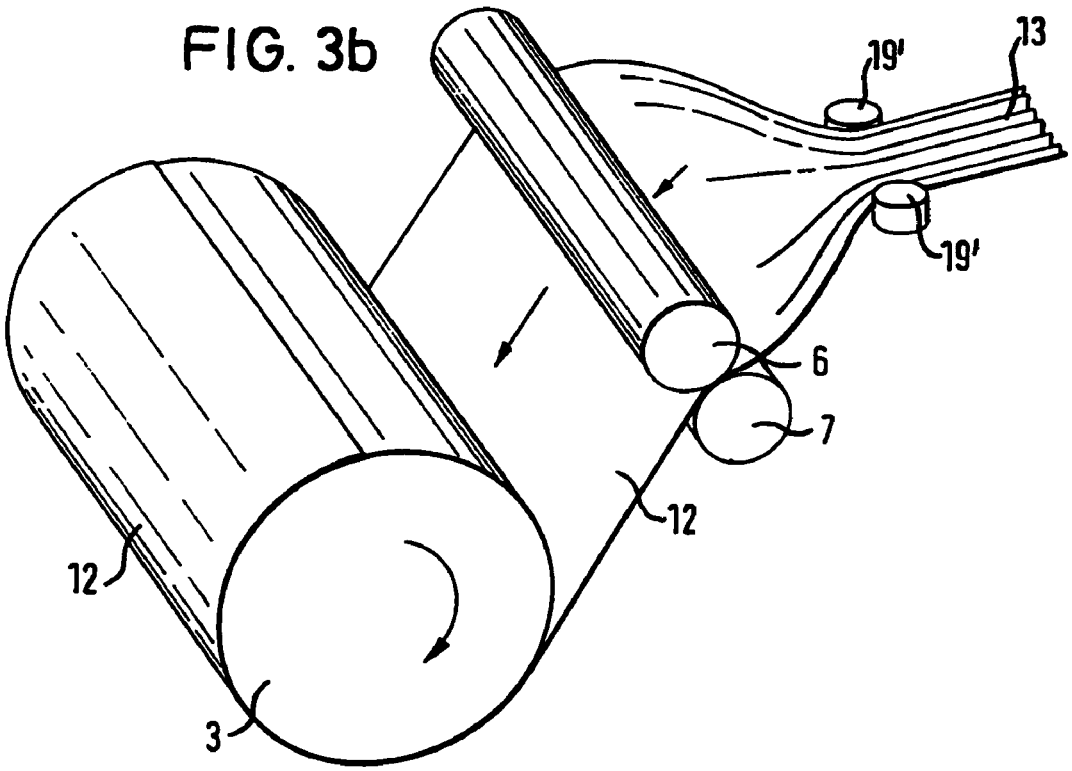
Figure 3C:
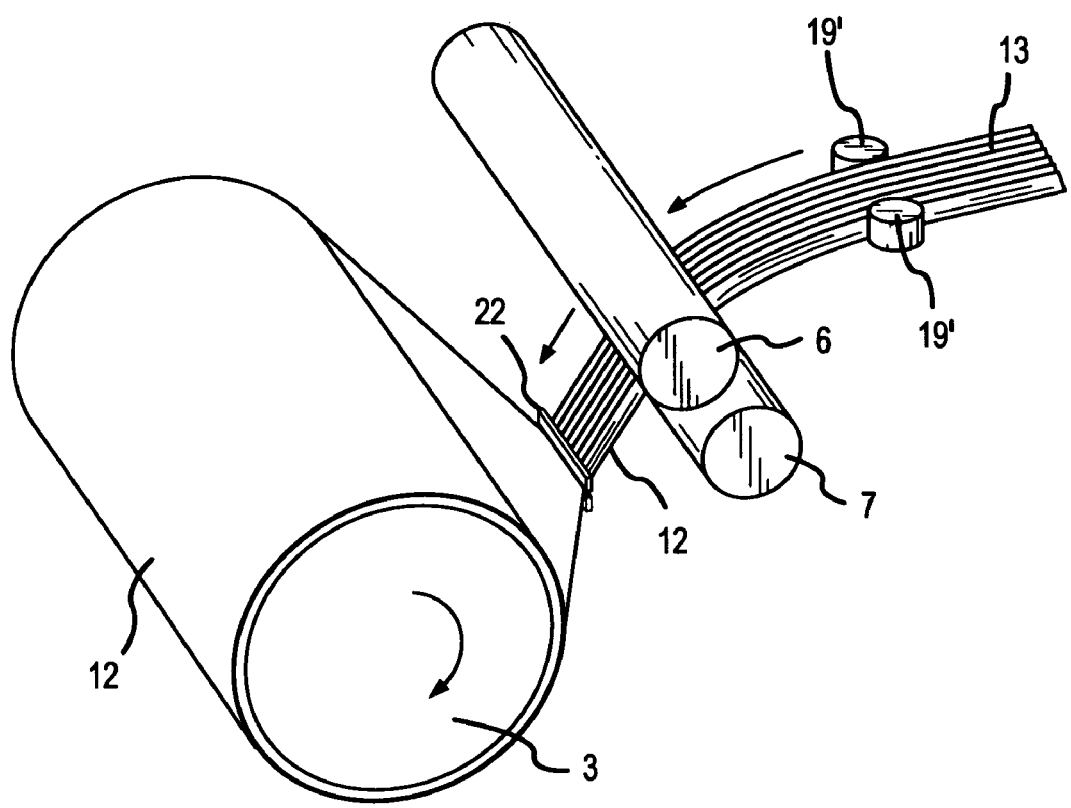
Figure 3D:
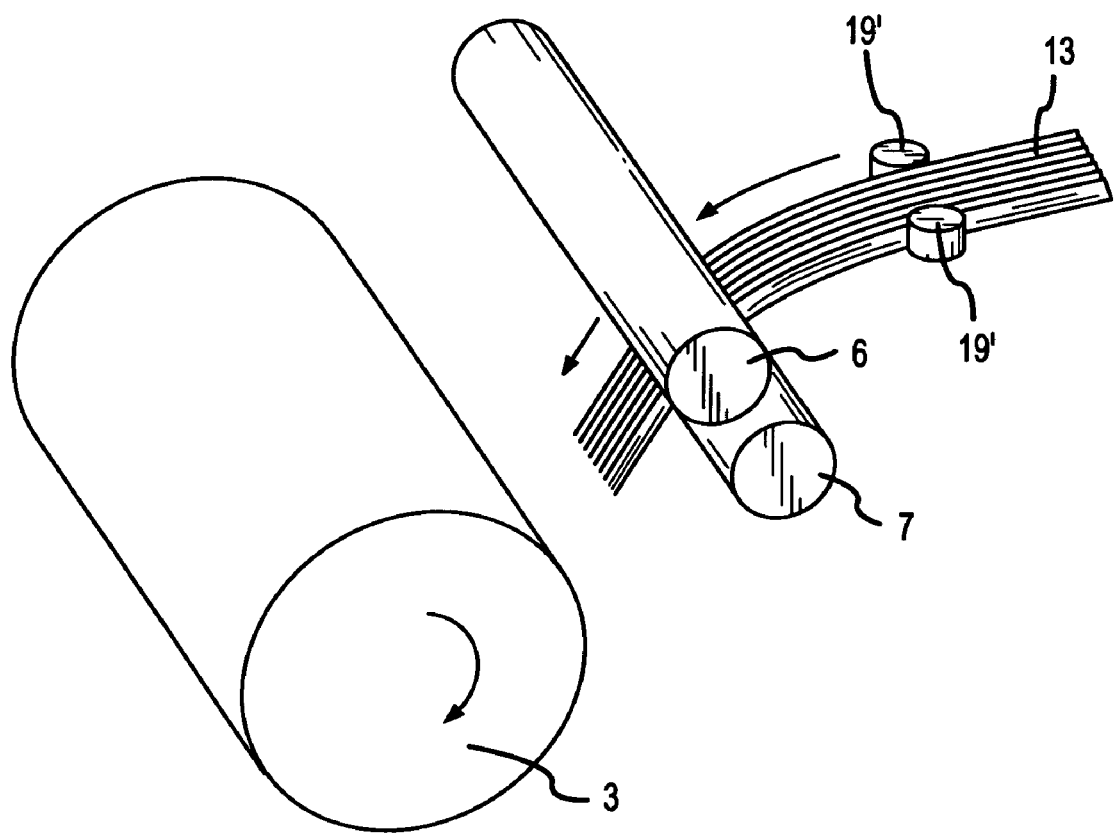
Figure 3E:
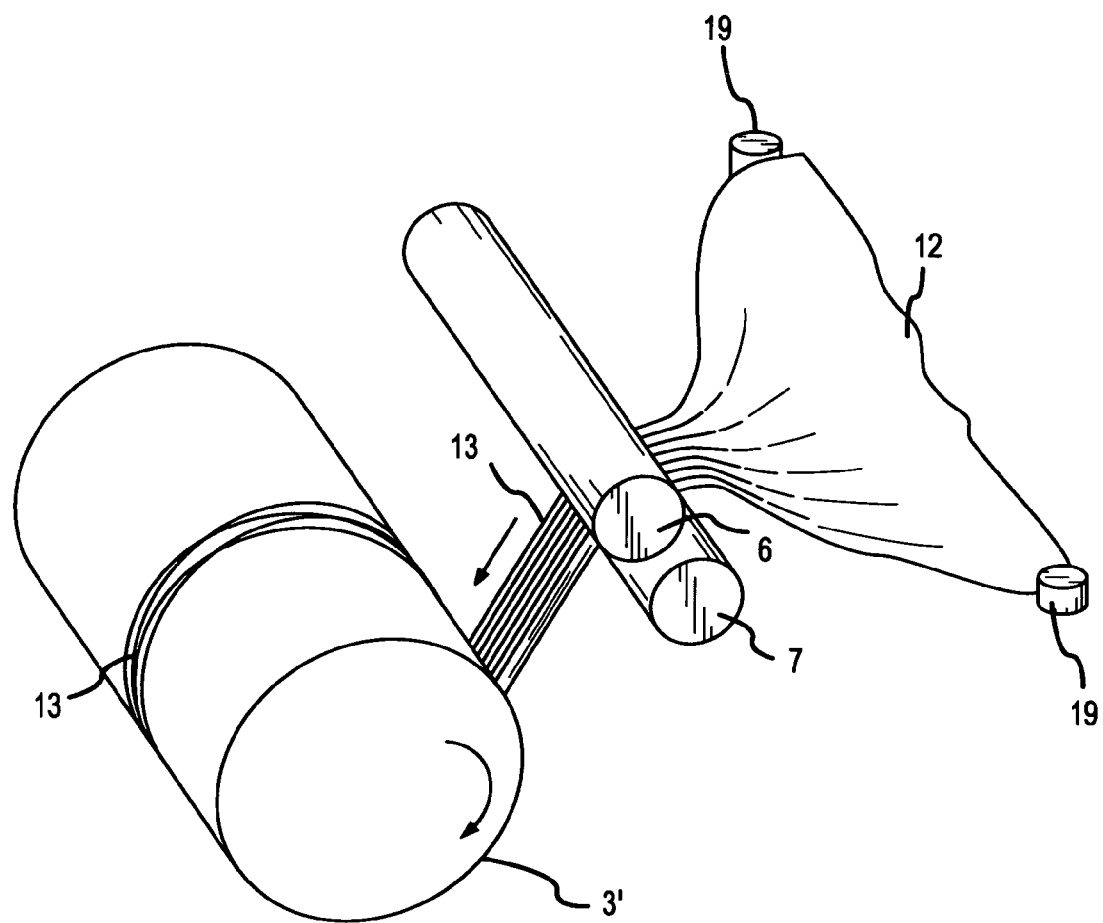

Shortly before the desired number of film layers is reached, the pivot arms 14 are inwardly pivoted, as shown in FIG. 3*b*, so that the rolls 19' bring together the film web edges of film web 12, and the film web in-between is gathered up, whereby with further pulling off the film, a film rope 13 having higher rigidity arises over a certain film web length. As shown in FIG. 3*c*, the film rope 13 is guided through the gap of the rollers 6, 7, and is then cut off by means of the cutting device 22. The finished wrapped round bale 3 is guided out from the press, and the production of a new round bale 3' starts, such as it is shown in FIG. 3*d*. As soon as the round bale 3' is completely pressed, the film rope is guided through the rollers 6, 7 between the round bales 3' and the endless belt 2, and by driving the endless belt 2, as shown in FIG. 3*e*, the film is carried along, so that after the pivot arms 14 have opened, the film web 12 gets in contact in its full width with the circumferential side of the round bale again. As soon as the desired layer number is reached on round bale 3' again, there ensues anew the formation of a film rope.

It has still to be noted that a deflection roll 5 is not imperative, and is not present in a preferred embodiment, so that the entire net wrapping device can be arranged very closely to the press chamber. Thereby, it is secured that the film rope 13 is always carried along by the bale.

Figure 4:
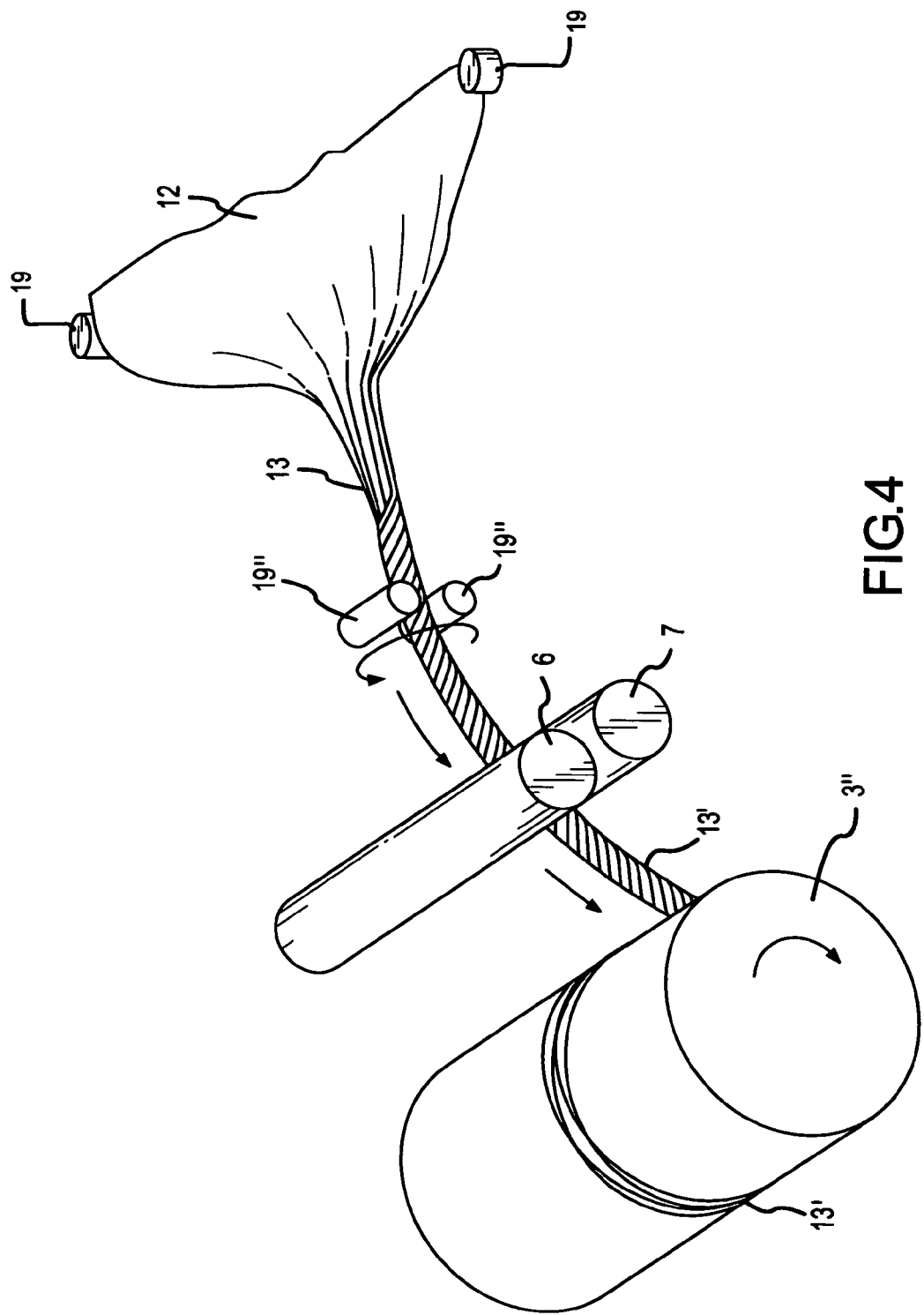
FIG. 4 is a schematic perspective view of an alternative embodiment of the present invention forming a film rope in a film web by twisting the film web.

FIG. 4 depicts an alternative, exemplary method for forming a film rope with the round bale press of FIG. 1. In this embodiment a twisted film rope 13' is formed by gathering the film web 12 between the rolls 19 to create a pinched film rope 13 as before and then twisting the pinched film rope 13 between rotating rolls 19" to create a twisted film rope 13'. The twisted film rope 13' then passes through the rollers 6,7 and is fed into the baler. The length of twisted film rope 13' provides a substantial lead to instantiate the wrapping of the film web 12 about the round bale 3" within the bale press. As in previous embodiments, the twisted film rope 13' allows the adhesive film web 12 to pass through the rollers 6,7 without the adhesive side of the film web 12 sticking to the adjacent roller 7. Once the twisted film rope 13' wraps around the round bale 3" a few times, the rotating rolls 19" may be removed, and the full width of the film web 12 may be fed to the rollers 6, 7. Because the round bale 3" is rotating within the bale press, it continues to pull the film web through the rollers 6, 7, thus preventing the adhesive side of the film web from sticking to the adjacent roller 7. In FIG. 4, the rolls 19 are depicted in an open position after having pinched the film web 12 together for a prescribed period of time. This allows the film web 12 to be wrapped around the bale at the full width of the film web 12 once the twisted film rope 13' engages the bale 3".

Figure 5:
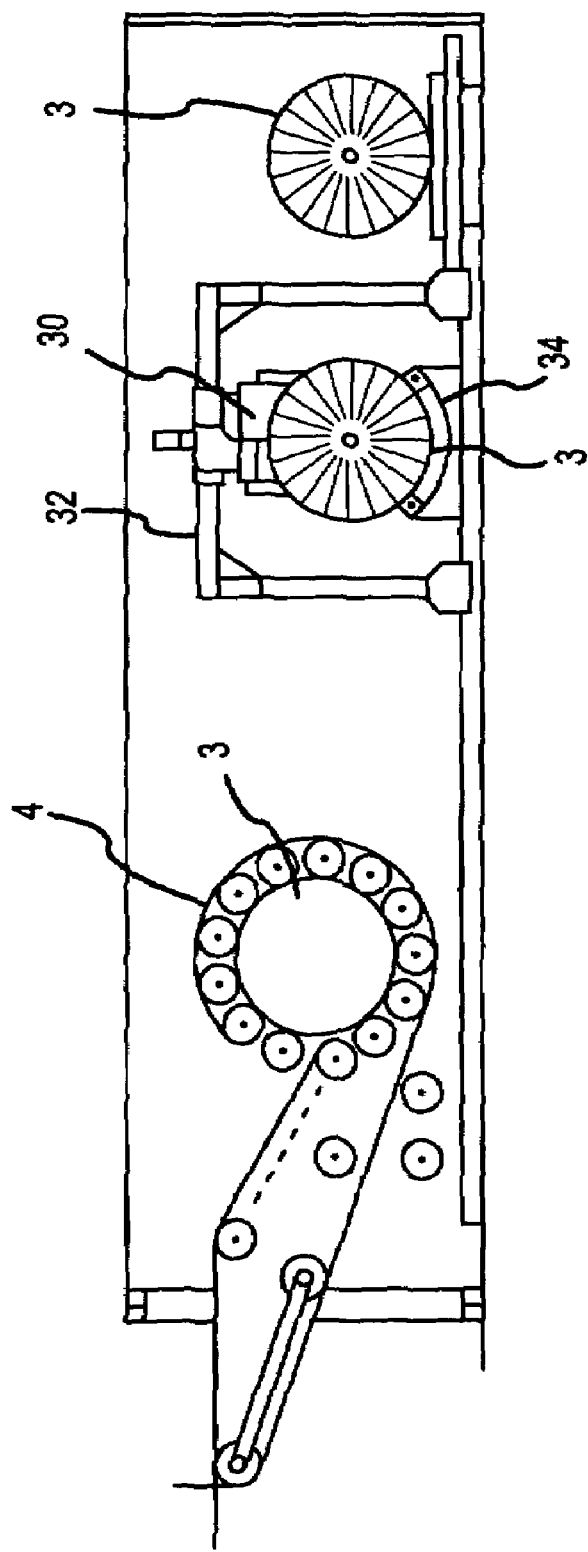
FIG. 5 is a schematic of a bale press of the present invention used in conjunction with an associated wrapping table.

FIG. 5 depicts the round bale press of the present invention in combination with an adjacent wrapping table 34. Once the bale 3 is initially wrapped within the bale press, more complete wrapping can also be carried out in a downstream film wrapping device 30. By forming a single layer or multiple layers of the adhesive film web on the cylindrical wall of the bale 3, sufficient strength and stability of shape for the further transportation of the bale 3 to the film wrapping device 30 is provided. The film-stabilized round bale 3 is output from the round bale press and transferred to a wrapping table 34, on which the round bale 3 is then completely wrapped with film. The bale 3 may be placed on its cylindrical sidewall on the wrapping table 34, allowing the wrapping table 34 to rotate the bale 3 about its axis. While the bale 3 rotates on the wrapping table, the wrapping arms 32 of the film wrapping device 30 revolve around the bale 3 to wrap film about the bale in an end-over-end fashion. By rotating the bale 3 on the wrapping table 34 simultaneously with the revolutions of the wrapping arms 32, the bale 3 is quickly completely encapsulated by the film web. The bale 3 is then output from the wrapping table 34, for example, onto a palette, for transportation. The risk of damage is reduced for a completely wrapped round bale 3 during transportation and handling of a finished wrapped bale, since the film is now pre-stressed in two directions, i.e., circumferentially around the cylindrical surface of the bale 3 and also over the axial ends of the cylindrical bale 3.

What is claimed is:

1. A method for wrapping a round bale pressed in a round bale press about at least a cylindrical surface area with an at least unilaterally adhesive film, the method comprising
    pulling the film off from a film roll in its entire width by means of a pulling-off device;
    forming a section of a film rope from the film by twisting the film during a predetermined space of time of the pulling-off operation according to the pulling step;
    introducing the film rope into a gap between the round bale to be wrapped and a device forming a circumferential press chamber wall;
    rotating the round bale so that the film rope present in the gap is carried along the cylindrical surface area;
    wrapping the bale with a portion of the film at its entire width following the section of the film rope; and
    continuing to rotate the round bale until a desired number of film layers of the film have formed on the cylindrical surface area of the round bale.

2. A method for wrapping a round bale pressed in a round bale press about at least a cylindrical surface area with an at least unilaterally adhesive film, the method the method comprising
    pulling the film off from a film roll in its entire width by means of a pulling-off device;

forming a section of a film rope by twisting the film during a predetermined space of time of the pulling-off operation according to the pulling step;

introducing the film rope into a gap between the round bale to be wrapped and a device forming a circumferential press chamber wall;

rotating the round bale so that the film rope present in the gap is carried along the cylindrical surface area;

wrapping the bale with a portion of the film at its entire width following the section of the film rope;

continuing to rotate the round bale until a desired number of film layers of the film have formed on the cylindrical surface area of the round bale;

forming another film rope shortly before the desired number of film layers have been wrapped on the round bale;

cutting the film web between the round bale and the film roll;

outputting the round bale from the round bale press;

transferring the round bale to a wrapping table; and wrapping the round bale completely with film.

3. The method of claim 2, characterized in that the film is wider than an axial width of the cylindrical surface area of the round bale and is wrapped around the cylindrical surface area in such a manner that the film projects at the two end faces of the round bale by approximately the same amount, and is wrapped against the two end faces during the step of completely wrapping the round bale with film.

4. A film wrapping device for a round bale pressed in a round bale press, in particular round bales including garbage, the device comprising an adhesive film roll holding device comprising a plurality of support rollers for holding a film roll;

a pulling-off device for pulling off a film web from the film roll;

a film rope forming device by means of which the pulled-off film web is formed into a film rope over a certain film web length and further characterized in that the film rope forming device comprises means causing the film to twist about the longitudinal direction of the film web; and a cutting means arranged downstream of the pulling-off device for cutting off the film web.

5. A film wrapping device for a round bale pressed in a round bale press, in particular round bales including garbage, the device comprising an adhesive film roll holding device comprising a plurality of support rollers for holding a film roll;

a pulling-off device for pulling off a film web from the film roll;

a film rope forming device by means of which the pulled-off film web is twisted and formed into a film rope over a certain film web length, wherein the film rope forming device further comprises a first arm;

a drive means connected with the first arm for moving the first arm with respect to a width of the film web to pinch a first lateral edge of the film web toward a center of the film web;

a second arm; and a mechanical coupling, which couples the first arm with the second arm, wherein the second arm moves symmetrically with the first arm to pinch a second lateral edge of the film web toward the center of the film web; and a cutting means arranged downstream of the pulling-off device for cutting off the film web.

* * * * *